United States Patent [19]
Rim

[11] Patent Number: 5,430,490
[45] Date of Patent: Jul. 4, 1995

[54] SCANNING FORMAT CONVERTING CIRCUIT USING MOTION VECTORS

[75] Inventor: Chai Y. Rim, Seoul, Rep. of Korea

[73] Assignee: Goldstar Co., Ltd., Seoul, Rep. of Korea

[21] Appl. No.: 291,479

[22] Filed: Aug. 17, 1994

[30] Foreign Application Priority Data

Aug. 18, 1993 [KR] Rep. of Korea .............. 16035/1993

[51] Int. Cl.$^6$ .......................... H04N 7/01; H04N 7/36
[52] U.S. Cl. .................................... 348/452; 348/416
[58] Field of Search ............ 348/452, 451, 448, 447, 348/458, 441, 416, 417, 407, 405, 415, 910, 606; H04N 7/01, 7/34, 7/36, 7/32, 7/50

[56] References Cited

U.S. PATENT DOCUMENTS

| | | | |
|---|---|---|---|
| 4,958,226 | 9/1990 | Haskell et al. | 348/416 |
| 5,134,477 | 7/1992 | Knauer et al. | 348/417 |
| 5,148,272 | 9/1992 | Acampora et al. | 348/415 |
| 5,208,667 | 5/1993 | Saunders | 348/452 |
| 5,305,104 | 4/1994 | Jensen et al. | 348/441 |

OTHER PUBLICATIONS

Murata et al., A Consumer Use Flicker-free Color Monitor Using Digital Signal Processing, Jun. 9, 1986, pp. 215–237.

Primary Examiner—James J. Groody
Assistant Examiner—Safet Metjahic

[57] ABSTRACT

A scanning format converting circuit for converting video signals of the interlaced scanning form involving flickers into those of the progressive scanning form free of flickers using motion vectors included in the video signals. In addition to a general decoding construction, the scanning format converting circuit includes an additional motion compensating unit and an additional frame memory. The additional motion compensating unit serves to motion-compensate input video data sent from frame memories using motion vectors and thereby derives data to be interpolated so that the video data of the interlaced scanning form is converted into those of the progressive scanning form.

8 Claims, 9 Drawing Sheets

SCANNING FORMAT CONVERTING CIRCUIT USING MOTION VECTORS

BACKGROUND OF THE INVENTION

1. Field of the Invention

The present invention relates to a scanning format converting circuit using motion vectors, and more particularly to a scanning format converting circuit for converting video signals of the interlaced scanning form involving flickers into those of the progressive scanning form free of flickers using motion vectors included in the video signals.

2. Description of the Prior Art

As a general format converting method for converting video signals of the interlaced scanning form into those of the progressive scanning form, there have been known a line doubling method, a field interpolation method and a method using motion vectors.

Figure 1:
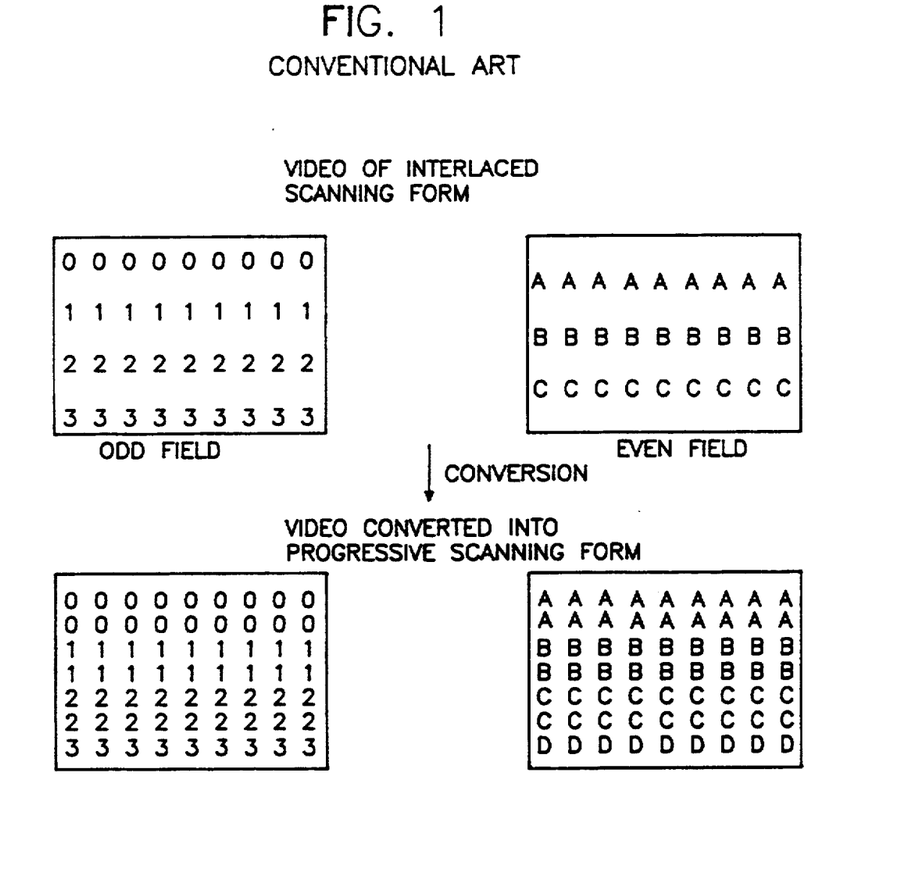
FIG. 1 is a diagram illustrating a scanning format conversion for video signals in accordance with a conventional line doubling method.
Figure 2:
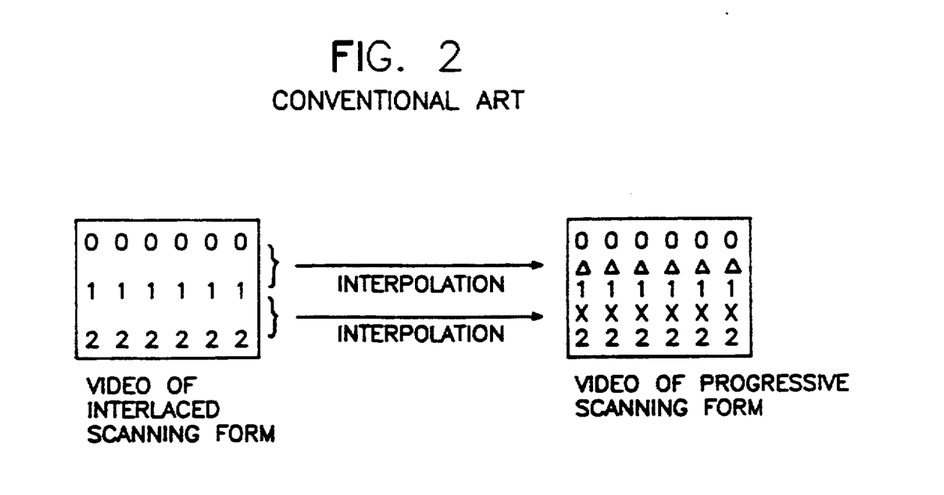
FIG. 2 is a diagram illustrating a scanning format conversion for video signals in accordance with a conventional interpolation method.

The line doubling method is adapted to repeat scanning for video signals for the interlaced scanning form one time and thereby double the number of scanning lines, as shown in FIG. 1. On the other hand, the field interpolation method is adapted to produce a new scanning line for an interpolation, using the mean value of adjacent scanning lines, as shown in FIG. 2. If the line doubling method is said to be the zeroth order interpolation, the field interpolation method corresponds to the first order interpolation.

Figure 3A:
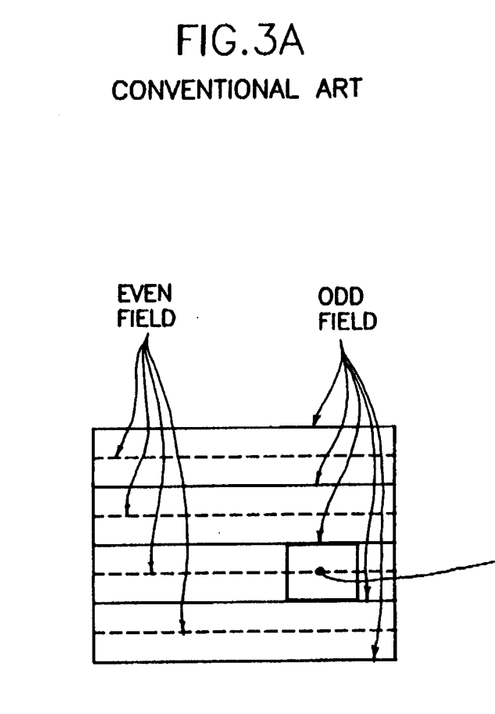
FIGS. 3a and 3b are a diagram illustrating a scanning format conversion for video signals in accordance with a conventional method using motion vectors.
Figure 3B:
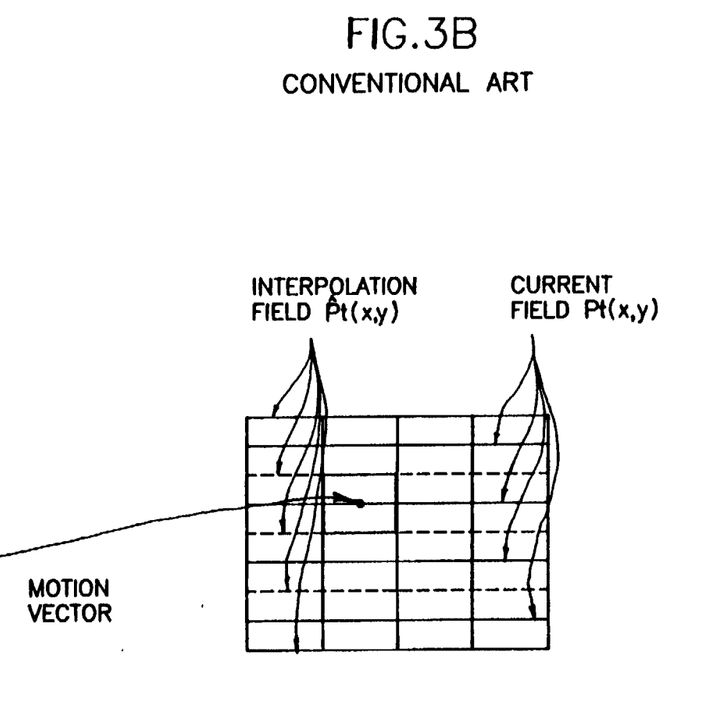

The method for converting video signals of the interlaced scanning form into those of the progressive scanning form using motion vectors is adapted to motion-compensate an even field and an odd field at the point of time t-1 by motion vectors, as shown in FIG. 3a, and thereby converting the fields into those of the progressive scanning form, as shown in FIG. 3b. Where no motion is involved between adjacent fields of video signals of the interlaced scanning form, even and odd fields are overlapped with each other (namely, interleaved) so that the video signals of the interlaced scanning form can be converted into those of the progressive scanning form. Where the video signals involve motions, however, the overlap (interleaving) between even and odd fields results in an aliasing phenomenon.

In order to avoid such an aliasing phenomenon, motion vectors involved between a current field and a previous field preceding the current field are derived by macro blocks having a certain size. Thereafter, a scanning format of the first field is converted into that of the progressive scanning form using an optional method, so that it is initialized. A field value to be interpolated for the current field is derived by shifting the previous video signal converted into the progressive scanning form by the motion vector size. For a next field, the same procedure is repeated.

In accordance with the above-mentioned conventional methods, in particular, the line doubling method, however, double-thickened horizontal lines may be produced. In a case of a slant plane, a stepped artifact may produced at a diagonal edge portion of the slant plane. In the case using motion vectors, the amount of computation for estimation of motion vectors is greatly increased, even though the most accurate scanning format converting can be achieved.

SUMMARY OF THE INVENTION

Therefore, an object of the invention is to provide a scanning format converting circuit for converting compressed video signals of the interleaved scanning form into those of the progressive scanning form by producing an interpolation field or frame using motion vectors included in the video signals of the interleaved scanning form and interleaving the interpolation field or frame between scanning lines of the video signals of the interleaved scanning form.

In accordance with the present invention, this object can be accomplished by providing a scanning format converting circuit comprising: a buffer for receiving compressed video data; a variable length decoder for receiving the video data from the buffer and decoding it; an inverse quantizer for inversely quantizing output data from the variable length decoder; an inverse discrete cosine transform unit for performing an inverse discrete cosine transform for output data from the inverse quantizer; a first adder for adding output data from the inverse discrete cosine transform unit to output data from first motion compensating means and sending the resultant signal to both the first frame memory and a digital/analog converter; the first frame memory for storing output data from the first adder and sending the stored data to both the first motion compensating means and second compensating means; the first motion compensating means for motion-compensating output data from the first frame memory and sending the resultant data to the first adder; the second motion compensating means for motion-compensating output data from both the first and second frame memories and sending the resultant data to both the second frame memory and the digital/analog converter; the second frame memory for storing the output data from the second motion compensating means and sending the stored data to the second motion compensating means; and the digital/analog converter for digital/analog-converting the output data from both the first adder and the second motion compensating means.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 4:
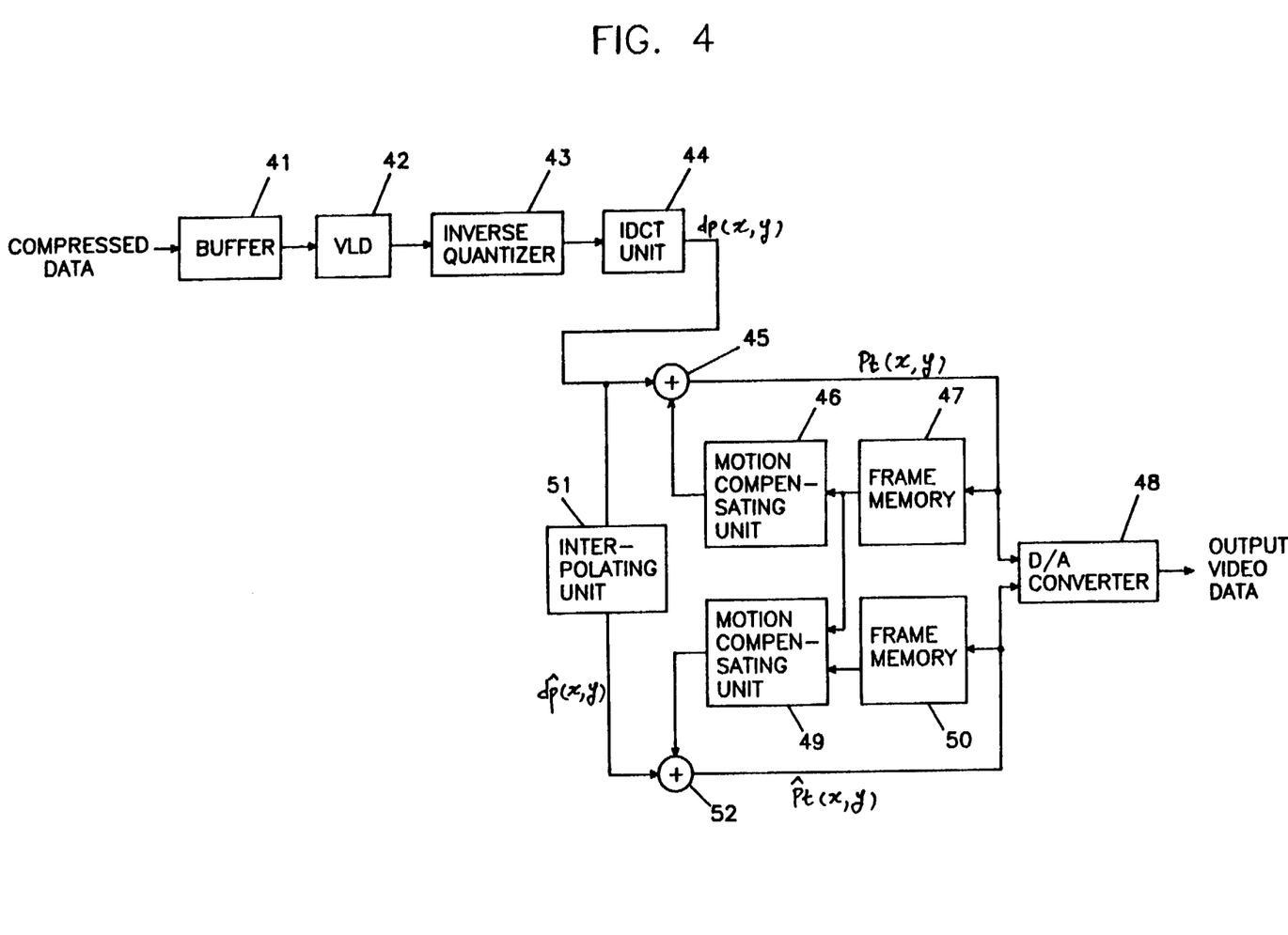
FIG. 4 is a block diagram illustrating a scanning format converting circuit using motion vectors in accordance with a first embodiment of the present invention.

Referring to FIG. 4, there is illustrated a scanning format converting circuit using motion vectors in accordance with a first embodiment of the present invention.

As shown in FIG. 4, the scanning format converting circuit includes a buffer 41 for receiving a video signal compressed by a variable length coding, a variable length decoder (VLD) 42 for receiving input data from the buffer 41 and decoding it, an inverse quantizer 43 for inversely quantizing a decoded signal outputted from the VLD 42, and an inverse discrete cosine transform (IDCT) unit 44 for recovering a quantized signal outputted from the inverse quantizer 43 in the form of a spatial signal. An adder 45 is also provided which serves to add an output signal of the IDCT unit 44 to an output signal of a motion compensating unit 46 and thereby recovering the original video signal. The resultant signal from the adder 45 is sent to a frame memory 47 and a digital/analog (D/A) converter 48. The frame memory 47 serves to store the video signal sent from the adder 45. The D/A converter 48 serves to convert the video signal sent from the adder 45 into an analog signal. The motion compensating unit 46 also constitutes a pan of the scanning format converting circuit and serves to motion-compensate the video signal stored in the frame memory 47. These arrangement of the scanning format converting circuit is similar to that of the general video data decoder. The scanning format converting circuit further includes an interpolating unit 51 for interpolating data received from the IDCT 44, an adder 52 for adding an output signal of the interpolating unit 51 to an output signal of a motion compensating unit 49 and sending the resultant signal to the D/A converter 48, and a frame memory 50 for receiving an output signal from the adder 52 and storing the received signal. The motion compensating unit 49 which also constitutes a pan of the scanning format converting circuit serves to receive output signals from the frame memories 47 and 50, motion-compensate the received signals and send the resultant signal to the adder 52.

Operation of the scanning format converting circuit in accordance with the first embodiment of the present invention will now be described.

First, video data of a variable length-coded current field is received in the VLD 42 via the buffer 41. The VLD 42 decodes the received video data and sends the resultant video data to the inverse quantizer 43. The decoded video data is inversely quantized in the inverse quantizer 43 which, in turn, sends the resultant video data to the IDCT 44. In the IDCT 44, the inversely quantized video data is recovered to the original video data in accordance with an inverse DCT procedure. The resultant video data from the IDCT 44 is sent to the adder 45. On the other hand, the motion compensating unit 46 receives video data of a previous field preceding to the current field and stored in the frame memory 47 and produces estimated data for the current field using motion vectors. The produced data from the motion compensating unit 46 is sent to the adder 45. In the adder 45, the estimated data for the current field received from the motion compensating unit 46 is added to differential pulse code modulation (DPCM) data dp(x,y) received from the IDCT 44, thereby producing video data for the current field. The produced video data from the adder 45 is sent to both the D/A converter 48 and the frame memory 47. The video data received in the D/A converter 48 is D/A converted and thereby outputted as decoded video data of the current field. For video data for a next field following the current field, the above procedures are repeated to decoded video data.

Where the scanning format of the input video signals to be decoded in accordance with the above procedures is of the interlaced scanning form, the scanning format of video signals being finally outputted is also of the interlaced scanning form.

On the other hand, the interpolating unit 51 interpolates vertically DPCM data of the opposite parity field to each field so as to convert DPCM data dp(x,y) of video signals of the interlaced scanning form into DPCM data dp(x,y) of video signals of the progressive scanning form in the IDCT 44. In other words, where "(x,y)" is the coordinate value of a pixel, the interpolation DPCM data dp(x,y) being produced by an interpolation in the interpolating unit 51 is derived from the following equation:

$$dp(x,y) = [dp(x,y-1) + dp(x,y+1)]/2$$

The produced DPCM data is then sent to the adder 52.

The motion compensating unit 49 motion-compensates the interpolation field data Pt-1 (x,y) interpolated between adjacent previous fields of the interlaced scanning form for the conversion into a video signal of the progressive scanning form received from the frame memory 50. The motion compensating unit 49 also motion-compensates the decoded video data of the previous field stored in the frame memory 47. As a result, data to be interpolated in the current field is derived. The derived data is sent to the adder 52.

The adder 52 adds the output data from the motion compensating unit 49 to the interpolation DPCM data dp(x,y) received from the interpolating unit 51, thereby producing the current interpolation field data Pt(x,y) to be interpolated between adjacent fields of the interlaced scanning form. The produced current interpolation field data is sent to both the frame memory 50 and the D/A converter 48. The D/A converter 48 D/A converts the interpolation field data and outputs the resultant data as video signals.

Where the video data of the interlaced scanning form is intra-coded, no motion compensation is required. In this case, the interpolation data produced in the interpolating unit 51 is directly used as an interpolation field for converting the video data of the interlaced scanning form into video data of the progressive scanning form, without being subjected to any motion compensation procedure.

Figure 6:
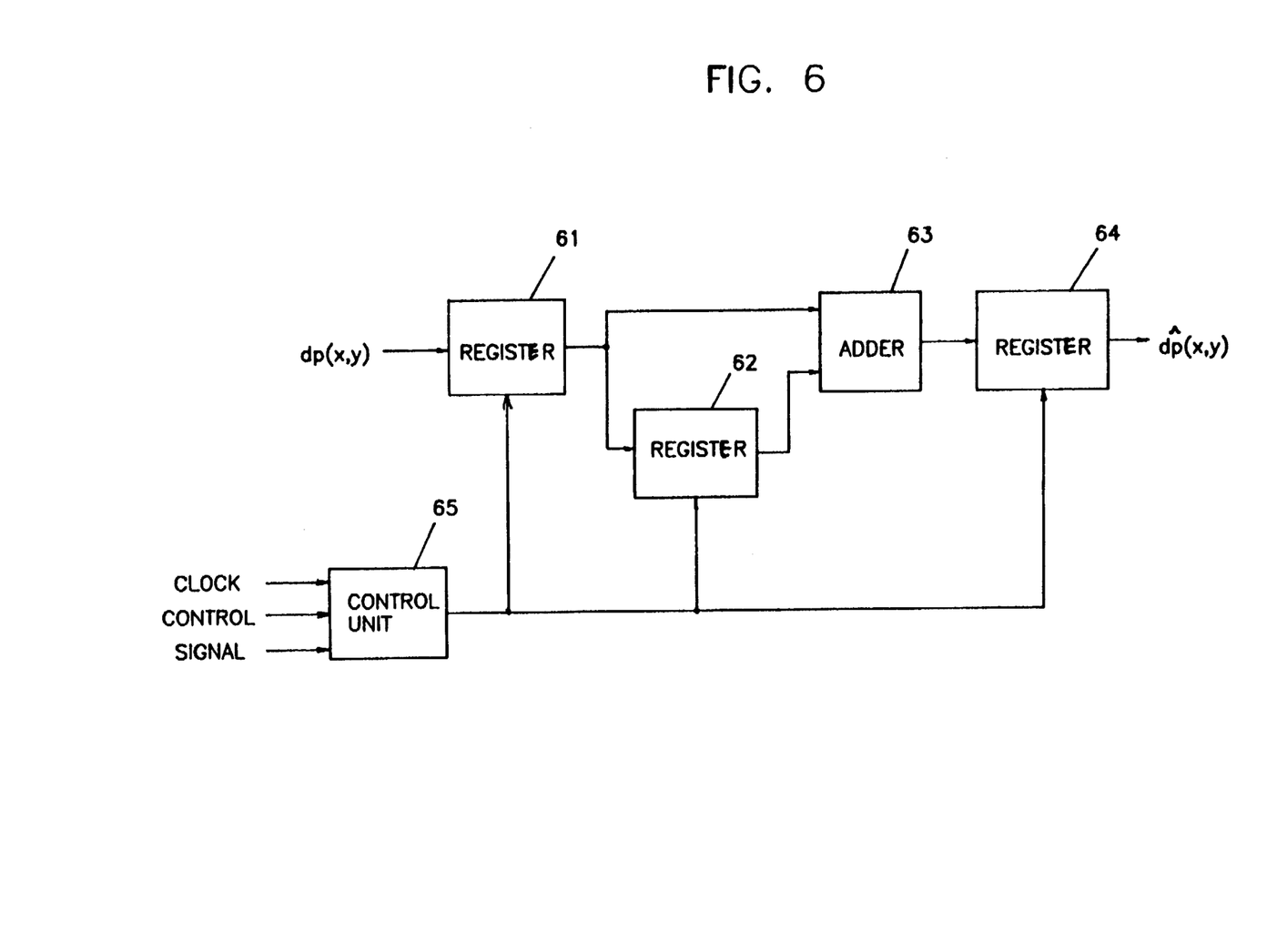
FIG. 6 is a block diagram illustrating an interpolating unit of FIG. 4.

FIG. 6 is a block diagram illustrating the interpolating unit 51 of FIG. 4. As shown in FIG. 6, the interpolating unit 51 includes a register 61 adapted to receive the DPCM data from the IDCT 44, a register 62 adapted to receive an output signal from the register 61, an adder 63 adapted to receive output signals from both the registers 61 and 62 and add the received signals together, a register 64 adapted to transmit an output signal from the adder 63 to the adder 52 of FIG. 4, and a control unit 65 adapted to control the registers 61, 62 and 64.

When the DPCM data dp(x,y) is applied to the register 61 of the interpolating unit 51 having the above-mentioned arrangement, the register 61 sends the received data to both the register 62 and the adder 63 in accordance with a control signal l₁ of the control unit 65. The DPCM data dp(x,y) received in the register 62 is delayed for a predetermined time and then sent to the adder 63 in accordance with a control signal l₂ of the control unit 65. The adder 63 adds the DPCM data received from the register 62 to the DPCM data received from the register 61, thereby producing interpolation DPCM data. The produced interpolation DPCM data from the adder 63 is sent to the register 64 which, in turn, delays the received interpolation DPCM data for a predetermined time and then sends it to the adder 52 in accordance with a control signal l₃ of the control unit 65.

Figure 7:
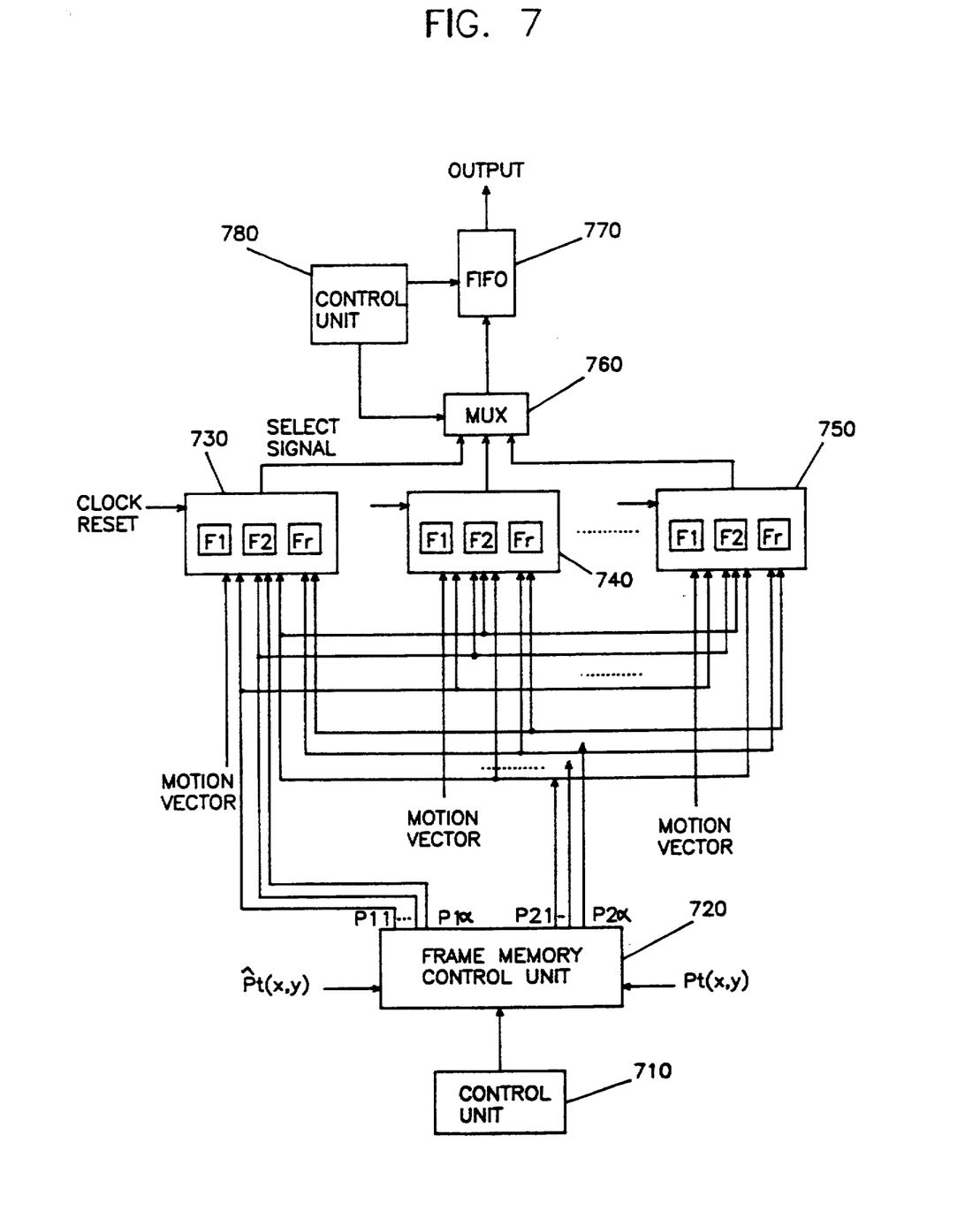
FIG. 7 is a block diagram illustrating a motion compensating unit of FIG. 4 or FIG. 5.

FIG. 7 is a block diagram illustrating the motion compensating unit 49 of FIG. 4. As shown in FIG. 7, the motion compensating unit 49 includes a frame memory control unit 720 adapted to sequentially send video data received from the frame memories 47 and 50 to β macro block motion compensators, only three of which are shown and denoted by the reference numerals 730, 740 and 750. The motion compensating unit 49 also includes a control unit 710 adapted to apply a selection signal and a control signal to the frame memory control unit 720 in accordance with a clock signal and a reset signal. The β macro block motion compensators constitute a pan of the motion compensating unit 49 and serve to motion-compensate the data received from the frame memory control unit 720. The motion compensating unit 49 further includes a multiplexors 760 adapted to receive data from the macro block motion compensators and multiplex the received data, a first-in first-out (FIFO) 770 adapted to receive data from the multiplexor 760 and output it in a first-in first-out manner, and a control unit 780 adapted to control both the multiplexor 760 and the FIFO 770.

As the video data from the frame memories 47 and 50 are received in the frame memory control unit 720 of the motion compensating unit 49 having the above-mentioned arrangement, the frame memory control unit 720 produces α data $P_{x1}$ to $P_{x\alpha}$ from the received data and sends them to each of the macro block motion compensators under a control of the control unit 710.

The macro block motion compensators motion-compensate β macro blocks in parallel, thereby producing interpolation macro blocks MBi. Signals respectively indicative of the interpolation macro blocks are multiplexed in the multiplexor 760 and then sequentially stored in the FIFO 770 which, in turn, sends the stored signals sequentially to the adder 52.

Assuming that each of the macro blocks has a size including j×k pixels and that the motion compensation is ranged from $-m'$ to m vertically and from $-n'$ to n horizontally, β, the number of the macro block motion compensators and α, the number of data received in each of the macro block motion compensators can be derived using the following equations:

$$\beta = int[(n'+n+k+1)/j]$$

$$\alpha = int[(m'+m+j+1)/j]$$

In the integral functions, a carry is performed.

Figure 8:
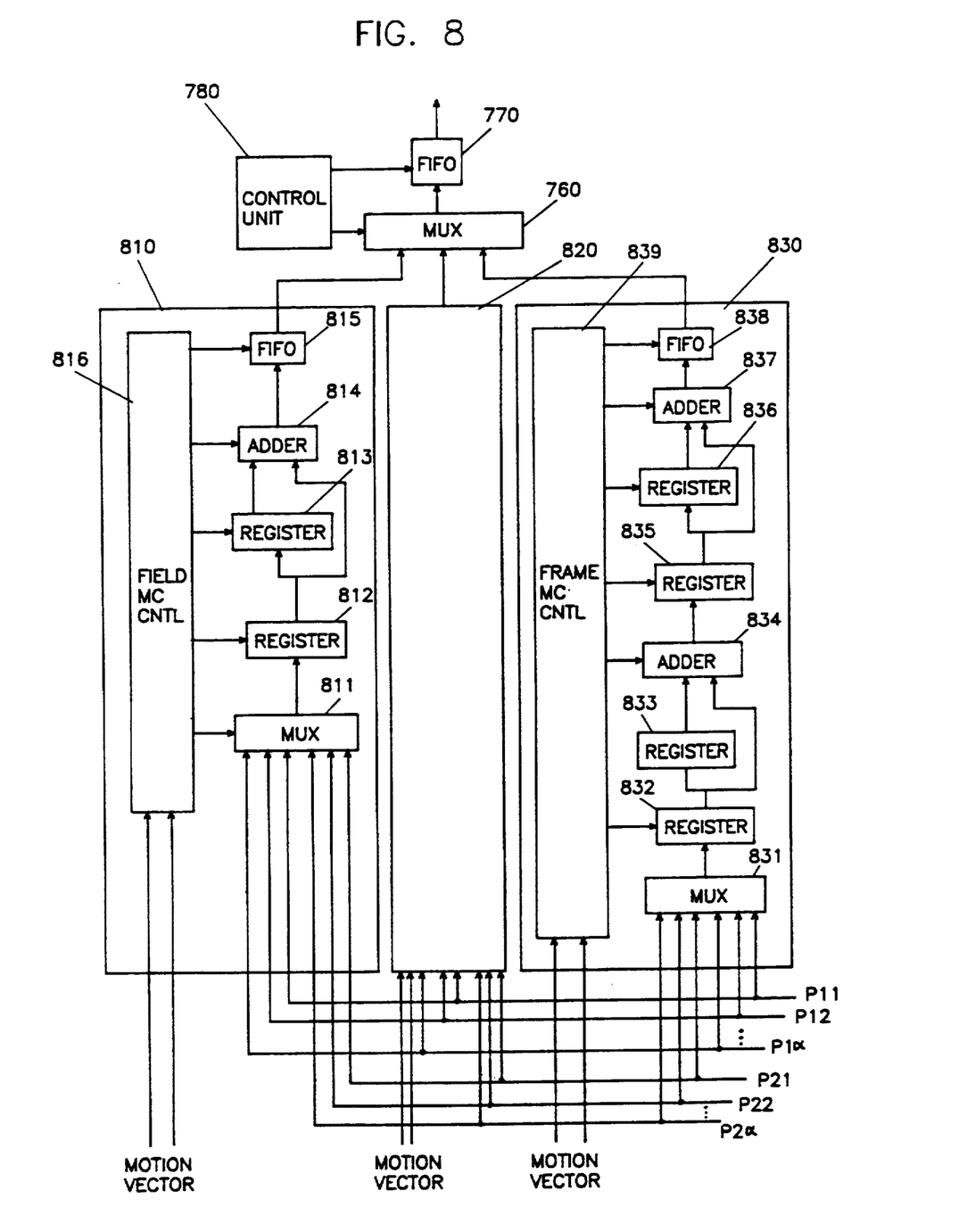
FIG. 8 is a block diagram illustrating a macro block motion compensator of FIG. 7 including two field motion compensators and one frame motion compensator.

Each of the macro block motion compensators includes two field motion compensators F1 and F2 and one frame motion compensator Fr. FIG. 8 is a block diagram illustrating detailed arrangements of the field motion compensators F1 and F2 and frame motion compensator Fr. In FIG. 8, the field motion compensators F1 and F2 are denoted by the reference numerals 810 and 820, respectively, whereas the frame motion compensator Fr is denoted by the reference numeral 830. As shown in FIG. 8, the field motion compensator 810 includes a multiplexor 811 adapted to multiplex pixel data received from the frame memory control unit 720 of FIG. 7, a register 8 12 adapted to receive data from the multiplexor 811, a register 813 adapted to receive data from the register 812, an adder 814 adapted to receive data from both the registers 812 and 813 and add the received data together, a FIFO 815 adapted to receive data from the adder 814 and send it to the multiplexor 760, and a field motion compensator control unit 816 adapted to control the multiplexor 811, the registers 812 and 813, the adder 814 and the FIFO 815.

The field motion compensator 820 has the same arrangement as the field motion compensator 810.

On the other hand, the frame motion compensator 830 includes a multiplexor 831 adapted to multiplex data received from the frame memory control unit 720 of FIG. 7, a register 832 adapted to receive data from the multiplexor 831, a register 833 adapted to receive data from the register 832 and delay the received data for a predetermined time, an adder 834 adapted to receive data from both the registers 832 and 833 and add the received data together, a register 835 adapted to receive data from the adder 834, a register 836 adapted to receive data from the register 835 and delay the received data for a predetermined time, an adder 837 adapted to receive data from both the registers 835 and 836 and add the received data together, a FIFO 838 adapted to receive data from the adder 837 and send it to the multiplexor 760, and a frame motion compensator control unit 839 adapted to control the registers 832, 835 and 836, the adders 834 and 837 and the FIFO 838.

Now, operation of the macro block motion compensating unit having the above-mentioned arrangement will be described.

Motion vectors include vectors of the field form and vectors of the frame form. An interpolation using motion vectors of the field form is carried out by the field motion compensators 810 and 820. The field motion compensator 810 performs the interpolation for odd fields, while the field motion compensator 820 performs the interpolation for even fields. On the other hand, an interpolation using motion vectors of the frame form is carried out by the frame motion compensator 830.

When field data of the interlaced scanning form of a previous field and data of an interpolation field for the previous field are applied to the multiplexor 811 of the field motion compensator 810, the multiplexor 811 multiplexes the applied data under a control of the field motion compensator control unit 816 and sends the resultant signal to the register 812. In accordance with a control signal from the control unit 816, the register 812 sends data received from the multiplexor 811 to both the register 813 and the adder 814. The register 813 delays the data received from the register 812 for a predetermined time and then sends it to the adder 814 in accordance with a control signal from the field motion compensator control unit 816. Then, the adder 814 adds the data received from the register 813 to the data received from the register 812 under a control of the field motion compensator control unit 816, thereby achieving a horizontal interpolation. The resultant signal from the adder 814 is then sent to the FIFO 815. Under a control of the field motion compensator control unit 816, the FIFO 815 sends the data received from the adder 814 to the multiplexor 760.

Where the motion vectors applied to the field motion compensator control unit 816 are motion vectors of a vertical integer multiple, the interpolation field for the current field is produced only by using data of the previous field. If the motion vectors applied to the field motion compensator control unit 816 are not those of the vertical integer multiple, but those of a half pixel size, the interpolation field by the motion compensation is then produced only by using interpolation data of the previous field without using data of the previous field, as different from the case of the motion vectors of the integer multiple.

On the other hand, where motion vectors of the frame form are received, interpolation frame data or interpolation field data for the previous frame is applied to the register 832 of the frame motion compensator 830 via the multiplexor 831. Then, the register 832 sends the signal received from the multiplexor 831 to both the register 833 and the adder 834 in accordance with a control signal from the frame motion compensator control unit 839. The register 833 delays the data received from the register 832 and then sends it to the adder 834. Under a control of the frame motion compensator control unit 839, the adder 834 adds the data received from the register 833 to the data received from the register 832, thereby achieving a vertical interpolation.

The resultant data from the adder 834 is then sent to the register 835 under a control of the frame motion compensator control unit 839. The register 835 sends the data received from the adder 834 to both the register 836 and the adder 837 under a control of the frame motion compensator control unit 839. The register 836 delays the data received from the register 835 and then sends it to the adder 837 under a control of the frame motion compensator control unit 839. Then, the adder 837 adds the data received from the register 836 to the data received from the register 835 under a control of the frame motion compensator control unit 839, thereby achieving a horizontal interpolation. The resultant data from the adder 837 is then sent to the FIFO 838. Under a control of the frame motion compensator control unit 839, the FIFO 838 sends the data received from the adder 837 to the multiplexor 760.

The frame motion compensator 830 performs both the vertical interpolation and the horizontal interpolation, while the field motion compensators 810 and 820 perform only the horizontal interpolation. Where no interpolation is required, the adders 814, 834 and 837 sends output signals of registers 813, 833 and 836 to the FIFO 815, the FIFO 838 and the register 835, respectively, without processing the signals.

Figure 5:
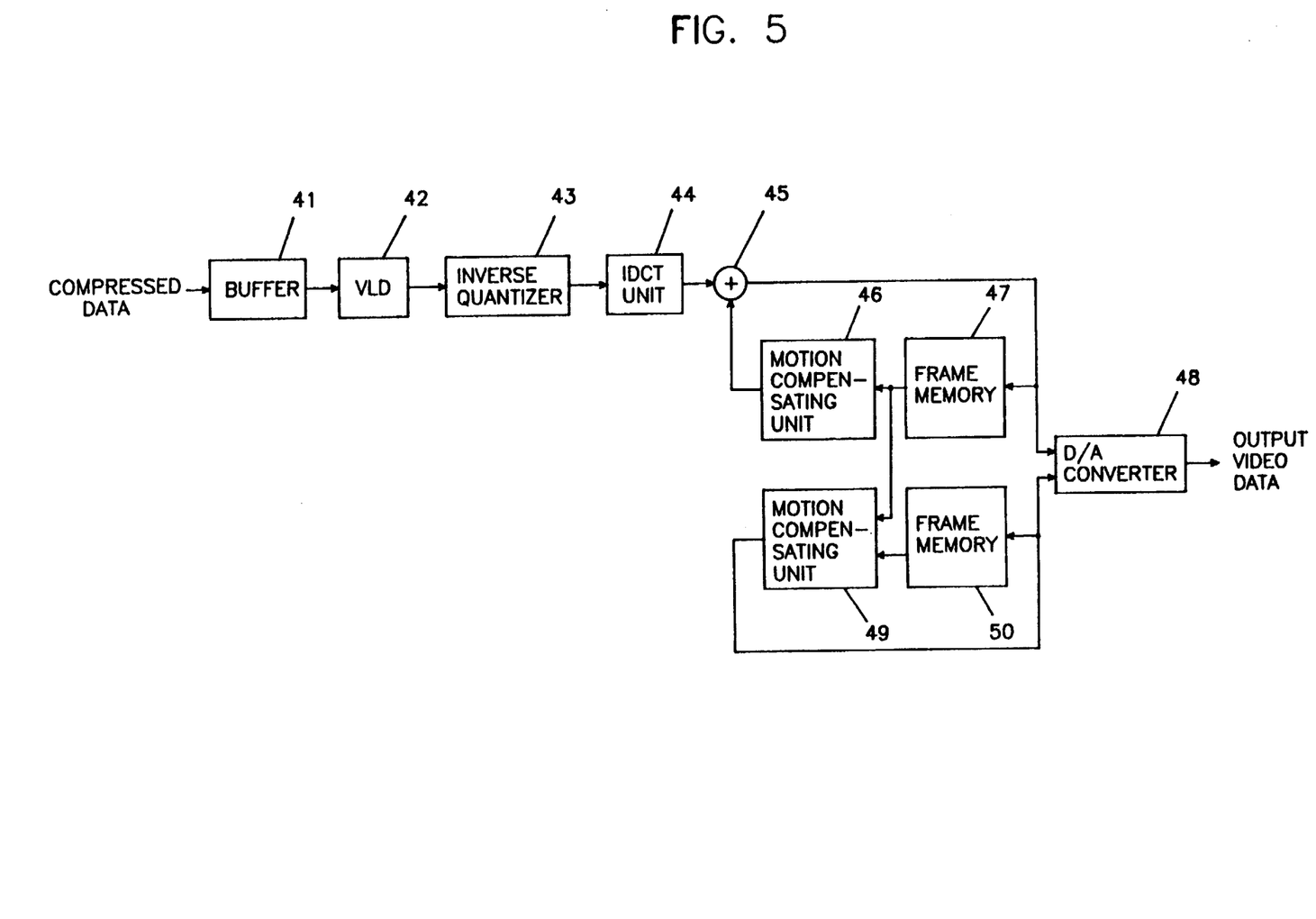
FIG. 5 is a block diagram illustrating a scanning format converting circuit using motion vectors in accordance with a second embodiment of the present invention.

FIG. 5 is a block diagram illustrating a scanning format converting circuit using motion vectors in accordance with a second embodiment of the present invention. The scanning format converting circuit of this embodiment has an arrangement similar to that of the first embodiment, except that the interpolating unit 51 and the adder 52 of the first embodiment are eliminated. The reason why the interpolating unit 51 is eliminated in the scanning format converting circuit of the second embodiment is because the interpolation rate of the interpolating unit 51 for DPCM data is very low. In other words, there is no important affect on picture quality even though the interpolating unit 51 is eliminated. Other operations carried out in the scanning format converting circuit of the second embodiment is identical to those in the scanning format converting circuit of the first embodiment.

Figure 9:
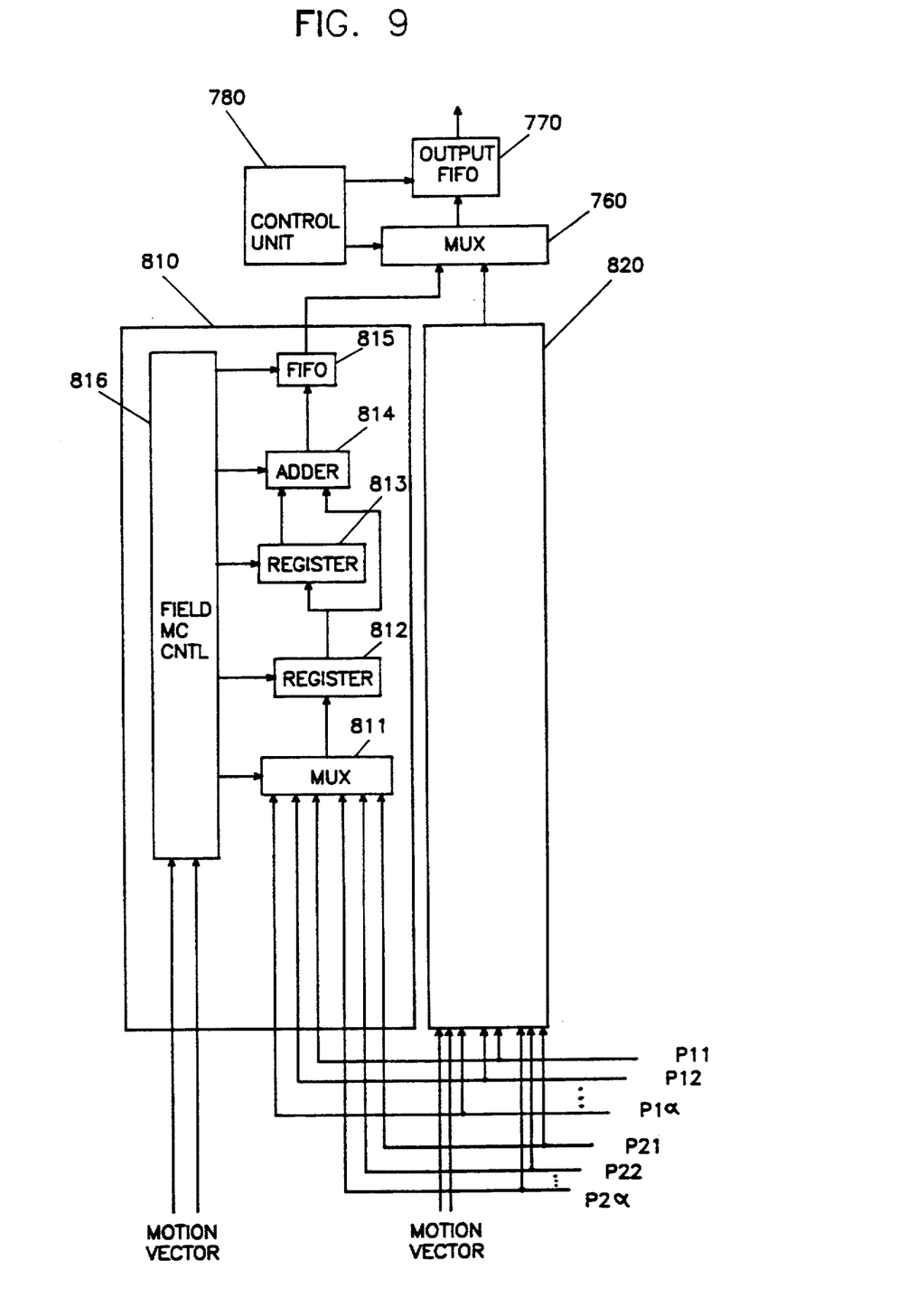
FIG. 9 is a block diagram illustrating a macro block motion compensator of FIG. 7 including two field motion compensators.

Meanwhile, where the motion vectors are those of the frame form, interpolation frame data for the current frame may be produced in the same manner as in the motion vectors of the field form by converting the motion vectors of the frame form into those of the field form. In this case, the motion compensating unit 49 may be constituted only by the field motion compensators 810 and 820, as shown in FIG. 9. In other words, the frame motion compensator 830 of FIG. 8 may be eliminated. In the case of FIG. 9, the motion compensators 810 and 820 operate in the same manner as in the case of FIG. 8. In the case of FIG. 9, however, the field motion compensator control unit 816 carries out the same operation as that of FIG. 8 after converting motion vectors of the frame form into those of the field form.

Where the Y-axis motion vector component Vy of an input motion vector (Vx,Vy) has an odd integer value, the interpolation is accomplished between opposite parity fields. That is, the odd field of the current frame is interpolated by the even field of the previous frame, while the even field of the current frame is interpolated by the odd field of the previous frame. Where the Y-axis motion vector component Vy has an even integer value, the interpolation is accomplished between the same parity fields. On the other hand, where the input motion vector has the half pixel size, the interpolation is accomplished between the same parity fields. In this case, the Y-axis motionvector component Vyt of the interpolation motion vector is derived from the following equation:

$$Vyt = int(Vyt - 1 + 0.5)/2)$$

Figure 10:
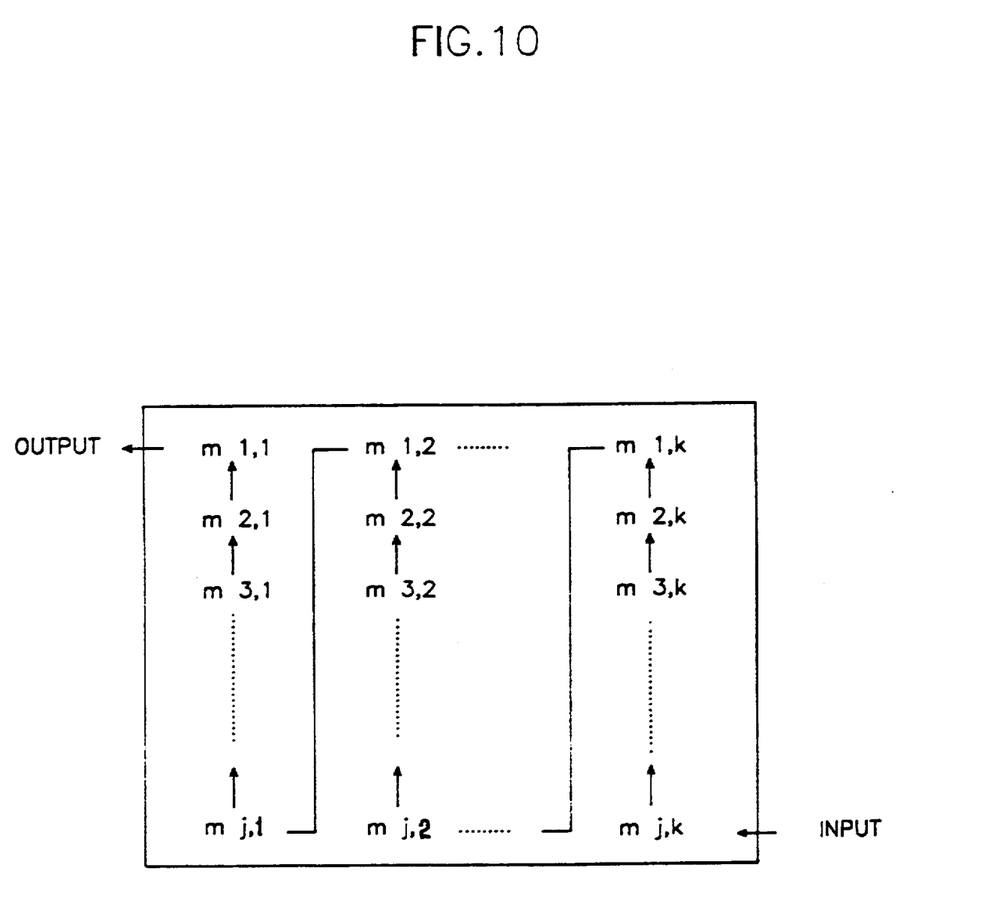
FIG. 10 is a diagram illustrating the order of video data inputted in and outputted from a macro block buffer of FIG. 7.

FIG. 10 is a diagram illustrating the order of video data inputted in and outputted from the macro block buffer.

As apparent from the above description, the present invention provides a scanning format converting circuit for converting video signals of the interlaced scanning form involving flickers into those of the progressive scanning form free of flickers using motion vectors included in the video signals, thereby capable of achieving an improvement in resolution.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A scanning format converting circuit comprising:
   a buffer for receiving compressed video data;
   a variable length decoder for receiving the video data from the buffer and decoding it;
   an inverse quantizer for inversely quantizing output data from the variable length decoder;
   an inverse discrete cosine transform unit for performing an inverse discrete cosine transform for output data from the inverse quantizer;

a first adder for adding output data from the inverse discrete cosine transform unit to output data from first motion compensating means and sending the resultant signal to both the first frame memory and a digital/analog converter;

the first frame memory for storing output data from the first adder and sending the stored data to both the first motion compensating means and second compensating means;

the first motion compensating means for motion-compensating output data from the first frame memory and sending the resultant data to the first adder;

the second motion compensating means for motion-compensating output data from both the first and second frame memories and sending the resultant data to both the second frame memory and the digital/analog converter;

the second frame memory for storing the output data from the second motion compensating means and sending the stored data to the second motion compensating means; and the digital/analog converter for digital/analog-converting the output data from both the first adder and the second motion compensating means.

2. A scanning format converting circuit in accordance with claim 1, further comprising:

interpolating means for receiving output data from the inverse discrete cosine transform unit and interpolating the received data; and a second adder for adding output data from the interpolating means to the output data from the second motion compensating means and sending the resultant data to both the second frame memory and the digital/analog converter.

3. A scanning format converting circuit in accordance with claim 1, wherein the second motion compensating means comprises:

a frame memory control unit adapted to sequentially send the output data received from the first and second frame memories to a plurality of macro block motion compensators;

a control unit adapted to control the frame memory control unit in accordance with a clock signal and a reset signal;

the plurality of macro block motion compensators adapted to receive output data from the frame memory control unit and motion vectors and perform motion compensation for the received data using the received motion vectors;

a multiplexor adapted to multiplex output data from the macro block motion compensators;

first-in first-out means adapted to receive output data from the multiplexor; and a second control unit adapted to control both the multiplexor and the first-in first-out means.

4. A scanning format converting circuit in accordance with claim 3, wherein the macro block motion compensators are two field motion compensators.

5. A scanning format converting circuit in accordance with claim 3, wherein the macro block motion compensators are two field motion compensators and one frame motion compensator.

6. A scanning format converting circuit in accordance with claim 2, wherein the interpolating means comprises:

a first register adapted to store the output data from the inverse discrete cosine transform unit and send it to both a second register and a third adder;

the second register adapted to store output data from the first register and send it to the third adder;

the third adder adapted to add output data from the second register to the output data from the first register;

a third register adapted to receive output data from the third adder; and a control unit adapted to control all the first, second and third registers.

7. A scanning format converting circuit in accordance with claim 4 or claim 5, wherein each of the field motion compensators comprises:

a multiplexor adapted to multiplex output data from the frame memory control unit;

a first register adapted to receive output data from the multiplexor and send it to both a second register and a third adder;

the second register adapted to send output data from the first register to the third adder;

the third adder adapted to add output data from the second register to the output data from the first register;

a first-in first-out unit adapted to receive output data from the third adder; and a field motion compensator control unit adapted to control all the multiplexor, the first and second registers, the third adder and the first-in first out unit.

8. A scanning format converting circuit in accordance with claim 5, wherein the frame motion compensator comprises:

a multiplexor adapted to multiplex output data from the frame memory control unit;

a first register adapted to receive output data from the multiplexor and send it to both a second register and a third adder;

the second register adapted to send output data from the first register to the third adder;

the third adder adapted to add output data from the second register to the output data from the first register;

a third register adapted to send output data from the third adder to both a fourth register and a fourth adder;

the fourth register adapted to send output data from the third register to the fourth adder;

the fourth adder adapted to add output data from the fourth register to the output data from the third register;

a first-in first-out unit adapted to receive output data from the fourth adder; and a frame motion compensator control unit adapted to control all the multiplexor, the first, third and fourth registers, the third and fourth adder and the first-in first out unit.

* * * * *